(12) United States Patent
Gondal et al.

(10) Patent No.: US 9,505,635 B2
(45) Date of Patent: Nov. 29, 2016

(54) WASTEWATER FILTRATION SYSTEM AND METHOD

(71) Applicants: Mohammed Ashraf Gondal, Dhahran (SA); Xiaofeng Chang, Nanjing (CN); Mohammad Ashraf Ali, Dhahran (SA); Mohamed Abdulkader Dastageer, Dhahran (SA); Syed M. Zubair, Dhahran (SA); John H. Lienhard, V, Lexington, MA (US)

(72) Inventors: Mohammed Ashraf Gondal, Dhahran (SA); Xiaofeng Chang, Nanjing (CN); Mohammad Ashraf Ali, Dhahran (SA); Mohamed Abdulkader Dastageer, Dhahran (SA); Syed M. Zubair, Dhahran (SA); John H. Lienhard, V, Lexington, MA (US)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 129 days.

(21) Appl. No.: 14/580,149

(22) Filed: Dec. 22, 2014

(65) Prior Publication Data
US 2015/0175444 A1   Jun. 25, 2015

Related U.S. Application Data

(60) Provisional application No. 61/918,837, filed on Dec. 20, 2013.

(51) Int. Cl.
*C02F 1/28* (2006.01)
*B01J 20/02* (2006.01)
(Continued)

(52) U.S. Cl.
CPC ............ *C02F 1/281* (2013.01); *B01J 20/02* (2013.01); *B01J 20/103* (2013.01);
(Continued)

(58) Field of Classification Search
CPC ............ C02F 1/281; C02F 2101/308; C02F 2103/24; C02F 2103/30; C02F 2303/16; B01J 20/3433
See application file for complete search history.

(56) References Cited

U.S. PATENT DOCUMENTS 2,029,966 A * 2/1936 Urbain .................... C02F 1/283
                                                                210/694
3,531,370 A    9/1970 Gould
(Continued)

FOREIGN PATENT DOCUMENTS

CN    101857328 A    10/2010
FR    2 744 035      8/1997

OTHER PUBLICATIONS

Sultan, Geochemical and isotopic constraints on the origin of the Rub Al Khali Groundwaters, Saudi Arabial, Oct. 2006, 2006 Annual Philadelphia Meeting, Salination and Process and Problems in Coastal and Inland Aquifers, Paper No. 38-11.*

(Continued)

*Primary Examiner* — Matthew O Savage
(74) *Attorney, Agent, or Firm* — Richard C. Litman

(57) ABSTRACT

The wastewater filtration system and method relates to systems and methods that use Ruba Al-Khali Saudi sand as the filtration media in systems for treating industrial wastewater. Ruba Al-Khali Saudi sand is effective in removing organic dyes, particularly rhodamine B, from the wastewater. The method includes bringing wastewater having an organic dye constituent into contact with the Saudi sand for a period of time sufficient to adsorb the organic dye. The system may include a batch reactor, such as a fixed bed or moving bed reactor, or a continuous flow reactor, such as a column reactor. When a batch reactor is used, the method may benefit from shaking or agitating the filtration media, particularly in the dark or under low ambient light conditions. The method may include regenerating the Saudi sand after use by heating the filtration media.

2 Claims, 8 Drawing Sheets

(51) Int. Cl.
    *B01J 20/28*     (2006.01)
    *B01J 20/34*     (2006.01)
    *B01J 20/10*     (2006.01)
    *C02F 101/30*     (2006.01)
    *C02F 103/30*     (2006.01)
    *C02F 103/24*     (2006.01)
    *C02F 1/66*     (2006.01)

(52) U.S. Cl.
    CPC ......... *B01J 20/28016* (2013.01); *B01J 20/34* (2013.01); *B01J 20/3483* (2013.01); *C02F 1/66* (2013.01); *C02F 2101/308* (2013.01); *C02F 2103/24* (2013.01); *C02F 2103/30* (2013.01); *C02F 2303/16* (2013.01)

(56) References Cited

U.S. PATENT DOCUMENTS

| | | | |
|---|---|---|---|
| 4,011,160 A | 3/1977 | Chamberlin et al. | |
| 4,045,171 A | 8/1977 | Lancy | |
| 4,147,665 A | * 4/1979 | Ikari | C02F 1/281 502/400 |
| 4,574,036 A | 3/1986 | Henriot | |
| 7,468,137 B2 | 12/2008 | Kojima et al. | |
| 7,491,337 B2 | 2/2009 | Karaman | |
| 2009/0045135 A1 | 2/2009 | Khudenko et al. | |
| 2012/0125844 A1 | 5/2012 | Dongare et al. | |
| 2012/0285887 A1 | 11/2012 | Zhang | |

OTHER PUBLICATIONS

Abu-Zeid et al, Textural attributes, mineralogy and provenance of sand dune fields in the greater Al Ain area, United Arab Emirates, Aug. 2001, Journal of Arid Environments, vol. 48, p. 475.*
Rauf et al, Adsorption of dyes from aqueous solutions onto sand and their kinetic behavior, Apr. 2008, Chemical Engineering Journal, vol. 137, pp. 238-243.*
Comerford, Investigation of photochemical reactions using UV-Vis spectroscopy, Feb. 1998, four pages.*
Ruth et al., "'Coated sand' excels at water purification," Rice University News & Media, Jun. 22, 2011.
"CLRI's technology for waste water treatment," The Hindu, Mar. 1, 2013.
M.I. El-Sayed, "The nature and possible origin of mega-dunes in Liwa, Ar Rub' Al Khali, UAE", Sedimentary Geology 134 (2000) 305-300.

* cited by examiner

WASTEWATER FILTRATION SYSTEM AND METHOD

CROSS-REFERENCE TO RELATED APPLICATION

This application claims the benefit of U.S. Provisional Patent Application Ser. No. 61/918,837, filed on Dec. 20, 2013.

BACKGROUND OF THE INVENTION

1. Field of the Invention

The present invention relates to industrial wastewater treatment, and particularly to a wastewater filtration system and method using Ruba Al-Khali Saudi sand as an adsorbent for organic dyes, such as rhodamine B.

2. Description of the Related Art

Wastewater from plants, such as those in the textile and leather industries, is often contaminated with organic pollutants, such as dyes, resulting in ecological and health problems in the surrounding areas. Rhodamine B ([9-(2-carboxyphenyl)-6-diethylamino-3-xanthenylidene]-diethyl-ammonium chloride) is a common dye found to contaminate wastewater and is of great concern, as rhodamine B is suspected to be carcinogenic.

There are a wide variety of methods for performing wastewater reclamation. However, such methods typically require large scale plants and great investments of time, energy and money in order to operate. In developing parts of the world, where resources are often limited, it is extremely difficult to implement large scale wastewater reclamation due to these factors. It would obviously be desirable to provide wastewater filtration and reclamation using a relatively cheap and easy process that takes advantage of materials and resources which are readily available.

Thus, a wastewater filtration system and method addressing the aforementioned problems is desired.

SUMMARY OF THE INVENTION

The wastewater filtration system and method relates to systems and methods that use Ruba Al-Khali Saudi sand as the filtration media in systems for treating industrial wastewater. Ruba Al-Khali Saudi sand is effective in removing organic dyes, particularly rhodamine B, from the wastewater. The method includes bringing wastewater having an organic dye constituent into contact with the Saudi sand for a period of time sufficient to adsorb the organic dye. The system may include a batch reactor, such as a fixed bed or moving bed reactor, or a continuous flow reactor, such as a column reactor. When a batch reactor is used, the method may benefit from shaking or agitating the filtration media, particularly in the dark or under low ambient light conditions. The Saudi sand is a more effective adsorbent when the pH is low, so that the method may include a step of acidifying the wastewater feed to lower the pH. The method may include regenerating the Saudi sand after use by heating the filtration media.

In some embodiments, the wastewater filtration system may include a filtration cell defining an open interior region and having an inlet port and an outlet port. The open interior region is at least partially filled with a Ruba Al-Khali Saudi sand adsorbent; i.e., sand collected from the Ruba Al-Khali desert region of Saudi Arabia. A wastewater influent, such as industrial wastewater containing rhodamine B, from an influent reservoir is delivered via a pump or the like through the inlet port for filtration through the adsorbent. An effluent reservoir is in fluid communication with the outlet port for collecting a filtered effluent. Following filtration, the contaminant may be desorbed from the Ruba Al-Khali Saudi sand adsorbent for regeneration and reuse thereof.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The wastewater filtration system and method relates to systems and methods that use Ruba Al-Khali Saudi sand as the filtration media in systems for treating industrial wastewater. Ruba Al-Khali Saudi sand is effective in removing organic dyes, particularly rhodamine B, from the wastewater. The method includes bringing wastewater having an organic dye constituent into contact with the Saudi sand for a period of time sufficient to adsorb the organic dye. The system may include a batch reactor, such as a fixed bed or moving bed reactor, or a continuous flow reactor, such as a column reactor. When a batch reactor is used, the method may benefit from shaking or agitating the filtration media, particularly in the dark or under low ambient light conditions. The Saudi sand is a more effective adsorbent when the pH is low, so that the method may include a step of acidifying the wastewater feed to lower the pH. The method may include regenerating the Saudi sand after use by heating the filtration media.

Figure 10:
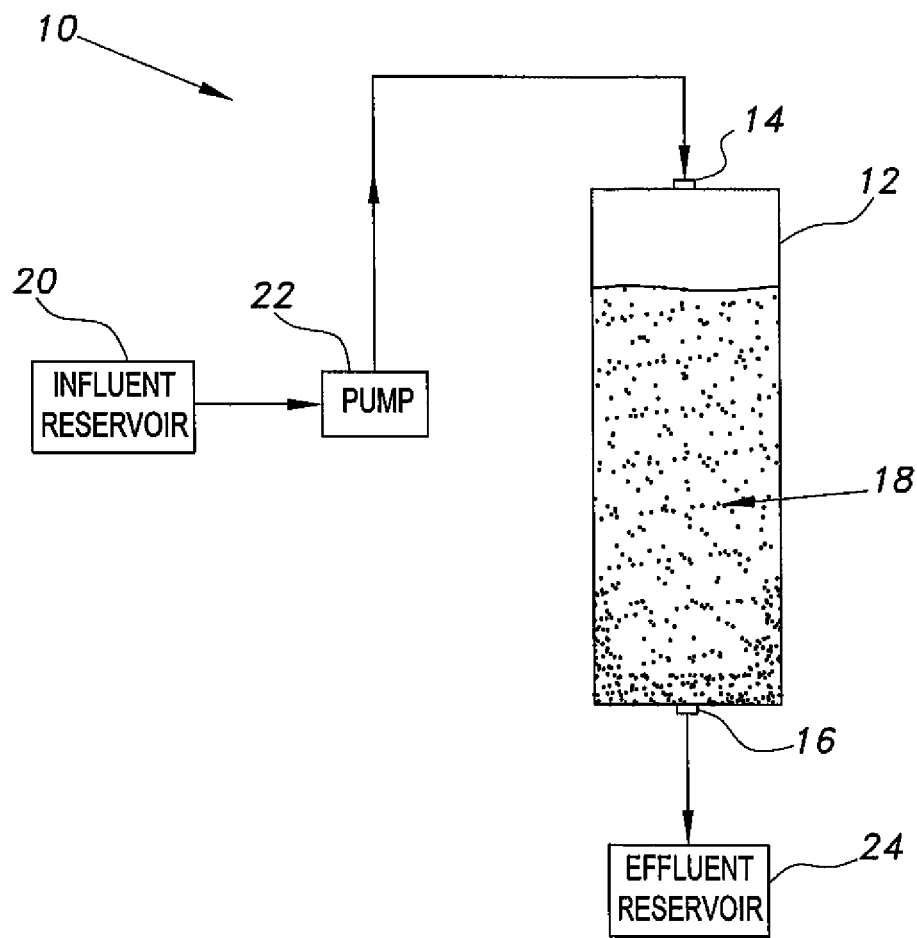
FIG. 10 diagrammatically illustrates an exemplary wastewater filtration system according to the present invention.

An exemplary wastewater filtration system 10, as shown in FIG. 10, may include a filtration cell 12 defining an open interior region and having an inlet port 14 and an outlet port 16. The open interior region is at least partially filled with a Ruba Al-Khali Saudi sand adsorbent 18; i.e., sand collected from the Ruba Al-Khali desert of Saudi Arabia. A wastewater influent, such as wastewater containing rhodamine B, from an influent reservoir 20 is delivered, via a pump 22 or the like, through the inlet port 14 for filtration through the adsorbent 18. An effluent reservoir 24 is in fluid communication with the outlet port 16 for collecting a filtered effluent.

The Saudi sand was collected from a specific location in the Saudi Arabian part of the Ruba Al-Khali desert. The Rub' al Khali, or Empty Quarter, is the largest sand desert in the world, encircling most of the southern third of the Arabian Peninsula, including most of Saudi Arabia and areas of Oman, the United Arab Emirates, and Yemen. Rub' al Khali covers about 250,000 square miles (650,000 sq. km.) in a structural basin lying mainly in southeastern Saudi Arabia, with lesser portions in Yemen, Oman, and the United Arab Emirates. It is the largest area of continuous sand in the world. It occupies more than one-quarter of Saudi Arabia. The topography is varied. In the west, the elevation is as high as 2,000 feet (610 meters), while in the east, the elevation drops to 600 feet (183 meters). The sand is reddish-orange in color due to the presence of feldspar.

The sand from Ruba Al-Khali is unique and different from other sand (which may be pure $SiO_2$). The Ruba Al-Khali sand has different salt and oxide compounds, and also heavy metals. It contains less than 45% $SiO2$. In addition, it contains $Al2O3$, $Fe2O3$, CaO, MgO, $K2O$, $Na2O$, $SO4$, Cl, Zn, Ca, and Ni. For a chemical analysis of Ruba Al-Khali sand, see Table 7 (which is hereby incorporated by reference herein) in M.I. Al-sayed, "The nature and possible origin of mega dunes in Liwa, Ar Rubah Alkhali, UAE", Sedementary Geology, 134 (2000), 305-330, at page 325. The inventors believe that since the sand is unique and rich in so many minerals, metals, and metal oxides, it is very effective in removal of organic dyes and other contaminants from wastewater. An exemplary composition for the sand would have at least: 2.54-44.30% $SiO2$, 0.55-5.52% $Al2O3$, 0.48-2.95% $Fe2O3$, 20.25-43.43% CaO, 2.01-15.38% MgO, 0.08-0.95% $K2O$, 0.04-2.39% $Na2O$, 0.07-30.30% $SO4$, and 0.00-0.59% Cl.

Experiments were conducted to examine the use of the Ruba Al-Khali Saudi sand in the removal of organic dyes, such as rhodamine B ([9-(2-carboxyphenyl)-6-diethylamino-3-xanthenylidene]-diethylammonium chloride), using a batch process. The batch sorption experiments were conducted to examine the sorption kinetics, sorption isotherm, the effect of solution pH, and rhodamine B concentrations in the solutions and contact times on rhodamine B sorption. All sorption experiments were carried out in a 200 mL breaker, and a suitable quantity of Ruba Al-Khali Saudi sand adsorbent was mixed with a rhodamine B aqueous solution with a known initial concentration. The mixture was stirred in a stir machine at a constant temperature. The mixture was then centrifuged at 4000 rpm in a centrifugation machine following the batch adsorption experiments so that the absorbance of rhodamine B could be determined using a UV-VIS spectrophotometer (with an absorption peak at 554 nm). Comparative experiments using typical sand were also performed.

Figure 1:
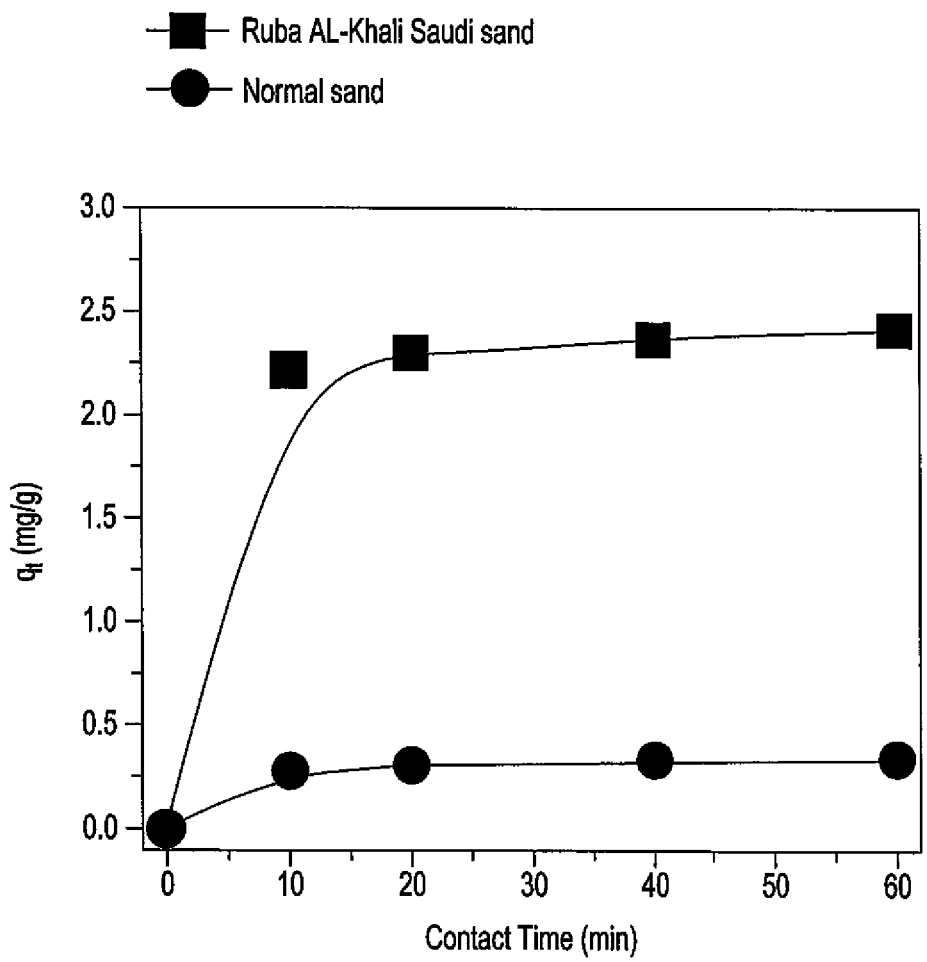
FIG. 1 is a graph comparing the adsorption capacity for rhodamine B of typical sand and of Ruba Al-Khali Saudi sand as a function of contact time at 282 K.

The Ruba Al-Khali Saudi sand (orange in color) and the typical sand (off-white in color) were ground into fine particles and then washed with distilled water to remove impurities. The typical sand was collected from the Dhahran area of Saudi Arabia. In a first experiment, 0.02 grams of Ruba Al-Khali Saudi sand was added to a flask containing Rhodamine B aqueous solution ($C_0$=6 mg/L, V=25 mL), which was then shaken under dark conditions in a thermostatic shaker at 150 rpm and a temperature of 282 K. After 25 minutes of adsorption, the Ruba Al-Khali Saudi sand adsorbent was separated from the solution by centrifugation, and the residual rhodamine B concentration in the filtrate was measured using UV-VIS spectroscopy. For purposes of comparison, 0.02 grams of the typical sand was also added to a flask containing 25 mL of rhodamine B aqueous solution ($C_0$=6 mg/L) and was then shaken under dark conditions in a thermostatic shaker at 150 rpm and 282 K. After 25 minutes of adsorption, the adsorbent was separated from the solution by centrifugation, and the residual rhodamine B concentration in the filtrate was measured by UV-VIS spectroscopy. The comparison of adsorption capacity ($q_t$) is shown in FIG. 1. Table 1 below shows a comparison of adsorption capacity (mg/g) of rhodamine B as a function of contact time at 282 K for the Ruba Al-Khali Saudi sand adsorbent and the typical sand. The data of Table 1 was collected from the batch experiments described below.

TABLE 1

| Comparison of Adsorption Capacity of Rhodamine B | | | | | |
|---|---|---|---|---|---|
| | 0.0 min | 10.0 min | 20.0 min | 40.0 min | 60.0 min |
| Ruba Al-Khali Saudi Sand (mg/g) | 0.0 | 2.21 | 2.30 | 2.37 | 2.41 |
| Typical Sand (mg/g) | 0.0 | 0.28 | 0.31 | 0.33 | 0.34 |

Figure 2:
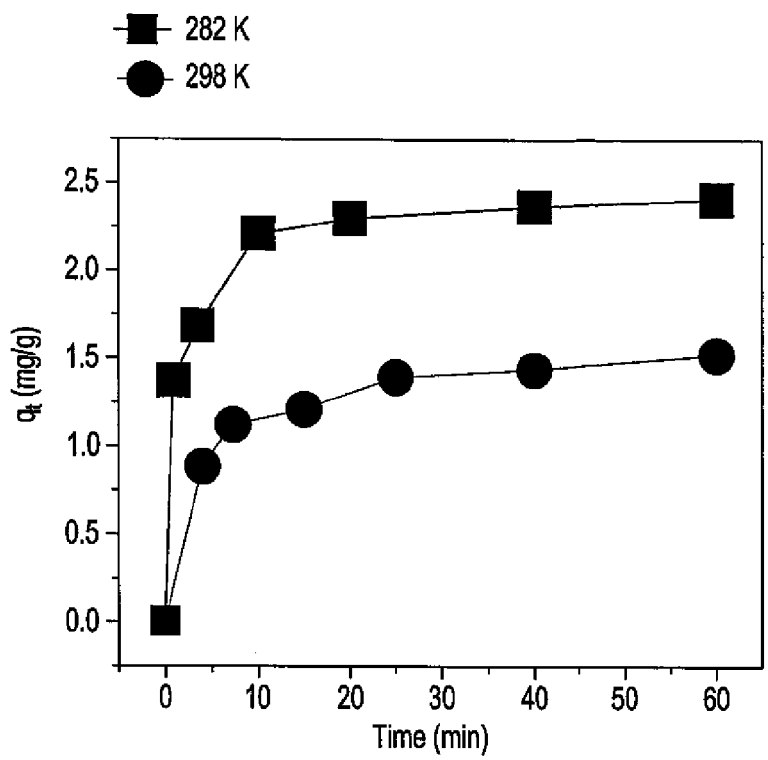
FIG. 2 is a graph comparing adsorption capacities for rhodamine B of Ruba Al-Khali Saudi sand adsorbent as a function of contact time at temperatures of 282 K and 298 K.

In a second experiment, 0.02 grams of the Ruba Al-Khali Saudi sand was added to a flask containing 25 mL of rhodamine B aqueous solution ($C_0$ varying between 1 and 8 mg/L) and was then shaken under dark conditions in a thermostatic shaker at 150 rpm and 298 K. After 25 minutes of adsorption, the adsorbent was separated from the solution by centrifugation, and the residual rhodamine B concentration in the filtrate was measured by UV-VIS spectroscopy. The comparison of the adsorption capacity of the rhodamine B, as a function of contact time), at 298 K compared against 282 K (from the first experiment), is shown in FIG. 2.

Figure 3:
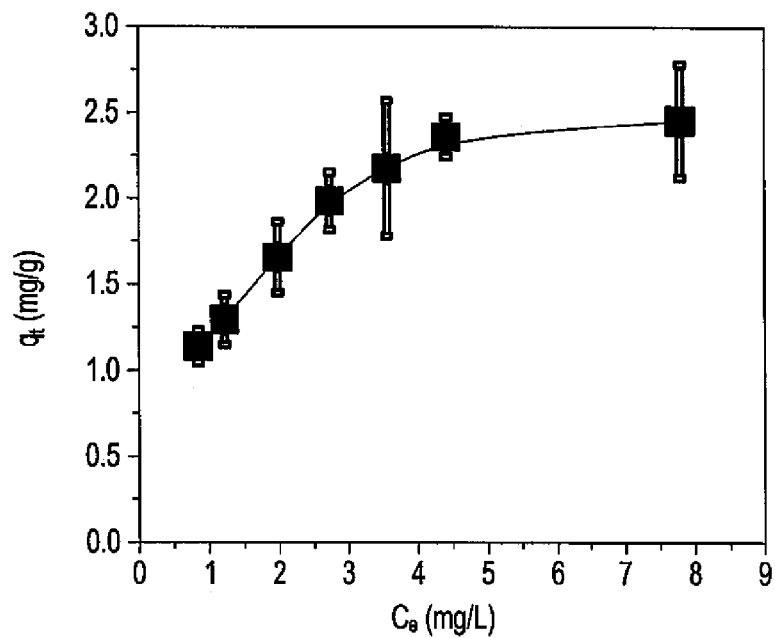
FIG. 3 is a graph showing sorption isotherms of the rhodamine B on Ruba Al-Khali Saudi sand adsorbent at room temperature.

FIG. 3 shows the adsorption isotherms of rhodamine B on the Ruba Al-Khali Saudi sand adsorbent at 298 K, and the Langmuir and Freundlich isotherm constants for adsorption of rhodamine B are given in Table 2 below. The results show that the rhodamine B could not be adsorbed favorably on the sand adsorbent (n<1). The regression correlation coefficients of the Langmuir model were close to 1.0, suggesting that the Langmuir isotherm model was better for describing the adsorption isotherm curve than Freundlich model, and the saturated adsorption capacity is modeled at 2.942 mg/g.

TABLE 2

Langmuir and Freundlich isotherm Constants for Adsorption of Rhodamine B

| Langmuir isotherm model | | | Freundlich isotherm model | | |
|---|---|---|---|---|---|
| $q_{max}$ (mg/g) | $K_L$ (L/mg) | $r^2$ | $K_F$ (mg$^{1-T/n}$ L$^{T/n}$/g$^{-1}$) | n | $r^2$ |
| 2.942 | 1.376 | 0.994 | 0.798 | 0.404 | 0.944 |

Figure 4:
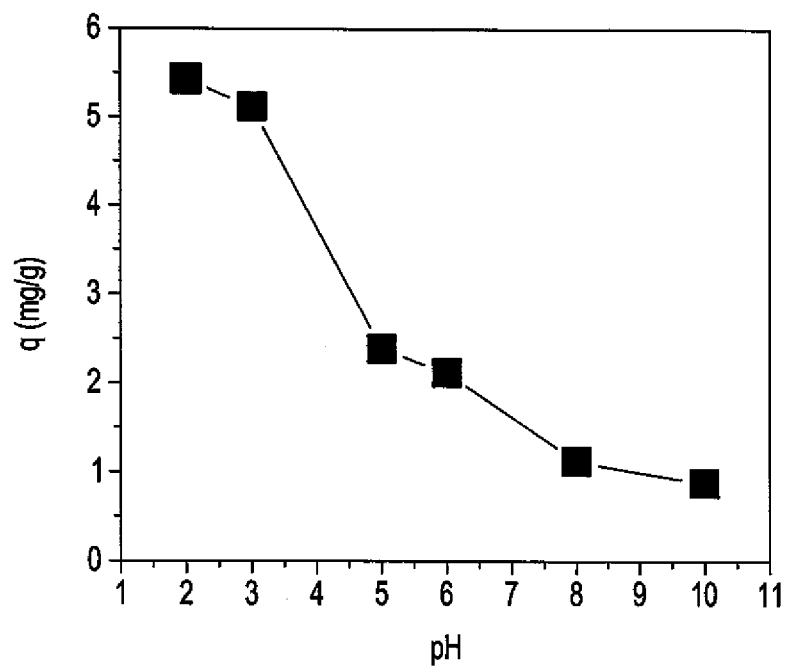
FIG. 4 is a graph showing the effect of solution pH on the adsorption capacity of the Ruba Al-Khali Saudi sand adsorbent for rhodamine B.

In a third experiment, 0.02 grams of the Ruba Al-Khali Saudi sand was added to a flask containing 25 mL of rhodamine B aqueous solution ($C_0$=6 mg/L) and was then shaken under dark conditions in a thermostatic shaker at 150 rpm and a temperature of 298 K. Before mixing, the pH of the rhodamine B solution was adjusted. The pH was varied between values of 2, 3, 5, 6, 8 and 10 in separate adsorption experiments. After 25 minutes of adsorption, the adsorbent was separated from the solution by centrifugation, and the residual rhodamine B concentration in the filtrate was measured by UV-VIS spectroscopy. FIG. 4 shows the effect of the solution pH on the rhodamine B sorption.

Figure 5:
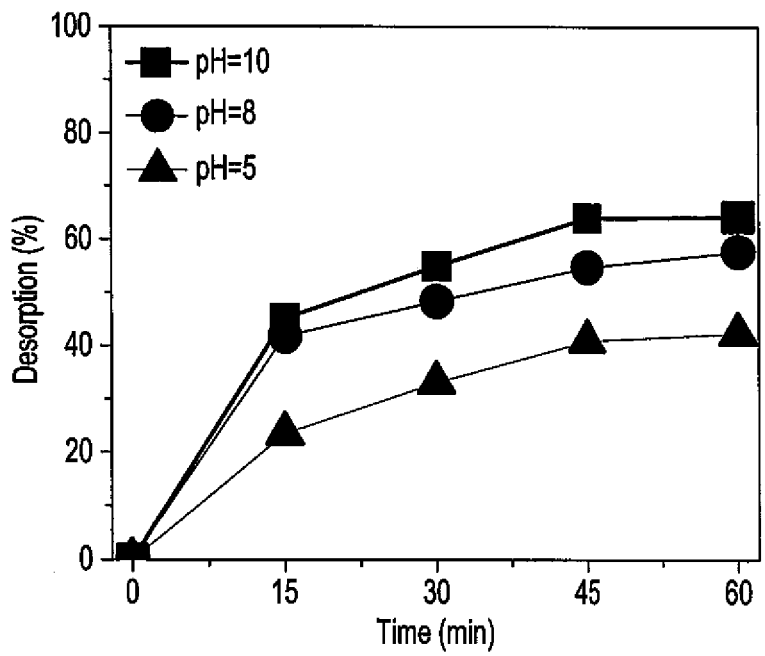
FIG. 5 is a graph comparing desorption of rhodamine B from the Ruba Al-Khali Saudi sand adsorbent at differing pH values as a function of time.
Figure 6:
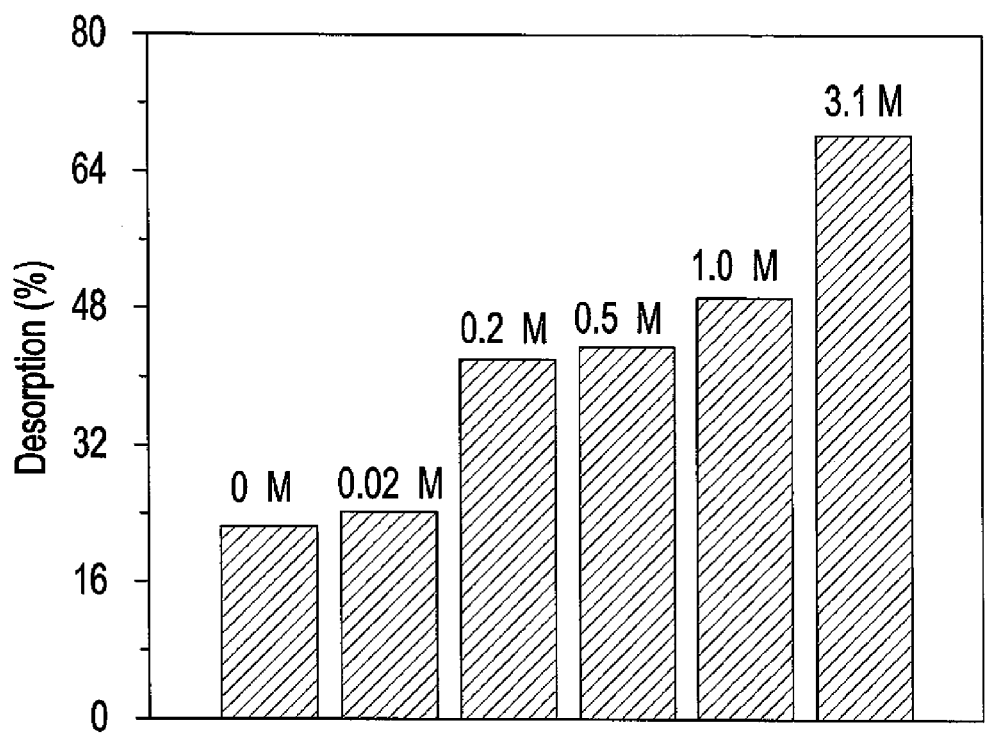
FIG. 6 is a graph comparing desorption of the rhodamine B from the Ruba Al-Khali Saudi sand adsorbent in differing concentrations of an aqueous solution of NaOH.

Additionally, batch processing using the Ruba Al-Khali Saudi sand for desorption of rhodamine B from the sand (to achieve regeneration) was also studied. Spent Ruba Al-Khali Saudi sand (0.01 grams) was added to a flask containing 25 mL of NaOH aqueous solution (six different concentration of NaOH solutions were used: 0.0, 0.02, 0.2, 0.5, 1.0 and 3.1 molar) and was then shaken under dark conditions in a thermostatic shaker at 150 rpm and a temperature of 298 K. After 25 minutes of desorption, the adsorbent was separated from the solution by centrifugation, and the residual rhodamine B concentration in the filtrate was measured by UV-VIS spectroscopy. FIG. 5 shows the effect of pH on rhodamine B desorption and FIG. 6 illustrates desorption percentage for each of the differing concentrations of NaOH solution).

The adsorption of rhodamine B onto the sand adsorbent is highly dependent on pH of the solution, as shown in FIG. 5, which affects the degree of ionization of the adsorbate. The maximum adsorption capacity of 5.5 mg/g can be achieved under a condition of a pH of 2. However, only adsorption capacity of 0.88 mg/g was obtained in an aqueous solution having a pH of 10, indicating the static electric absorption mechanism occurred during the adsorption process. As a basic dye, rhodamine B molecules can extract OH$^-$ and becomes positively charged at low pH, thereby increasing electrostatic attractions between positively charged dye anions and negatively charged adsorption sites and causing an increase in the dye adsorption. With the gradual increase in the pH of the solution, a decrease in the positive charge on the oxide or solution interface can be expected. The removal of dye decreases at higher pH values may be due to the abundance of OH$^-$ ions and electrostatic repulsion between the negatively charged surface of adsorbent and the anionic acid dye molecules. There are also no exchangeable anions on the outer surface of the adsorbent at higher pH values due to the presence of excess OH$^-$ ions competing with dye anions for adsorption sites and, as a result, the adsorption decreases.

The desorption efficiency (desorption %) increases from 42% to 64% with increasing pH from 5 to 10, indicating that the basic condition might be beneficial to the desorption of rhodamine B molecules from the surface of the sand adsorbent (as seen in FIG. 5). Desorption was found to significantly increase at the initial stage of desorption time and gradually reached an adsorption-desorption equilibrium after desorption proceeded for one hour.

Sodium hydroxide (NaOH) aqueous solution was used as an efficient effluent for rhodamine B desorption from the spent adsorbent, in terms of regeneration efficiency. The desorption % of rhodamine B increased from 23% to 68% by increasing the molar concentration of NaOH from 0.0 M to 3.1 M. Desorption of rhodamine B molecules from the spent adsorbent may be due to the electrostatic repulsion between the adsorbent and rhodamine B in NaOH solution, as shown in FIG. 6.

Further experiments were performed to examine the use of the Ruba Al-Khali Saudi sand in the removal of organic dyes, such as rhodamine B, using a continuous flow process in a glass column, such as the filtration cell 12 of system 10 (shown in FIG. 10). The flow sorption experiments were conducted to examine the effect of empty bed contact times (EBCTs) on adsorption, the pH of the rhodamine B solutions, and rhodamine B concentrations in the solutions on rhodamine B sorption. The sand bed volume was 0.68 cm$^3$ and the rhodamine B aqueous solution was poured onto the bed of sand. The effluent from the column was collected at set time intervals, and the residual rhodamine B concentrations were analyzed by UV-VIS spectrophotometer. The volume at which rhodamine B concentration in the effluent reached the maximum permissible value was regarded as the breakthrough point.

Figure 7A:
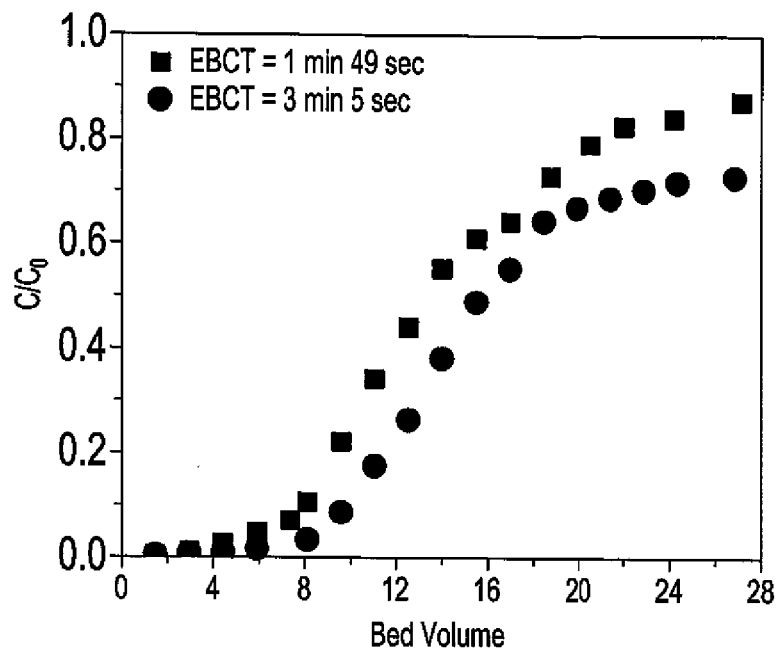
FIG. 7A is a breakthrough plot showing rhodamine B concentration as a function of bed volume in a column of Ruba. Al-Khali Saudi sand adsorbent, shown for empty bed contact times (EBCTs) of 1 minute and 49 seconds, and 3 minutes and 5 seconds.
Figure 7B:
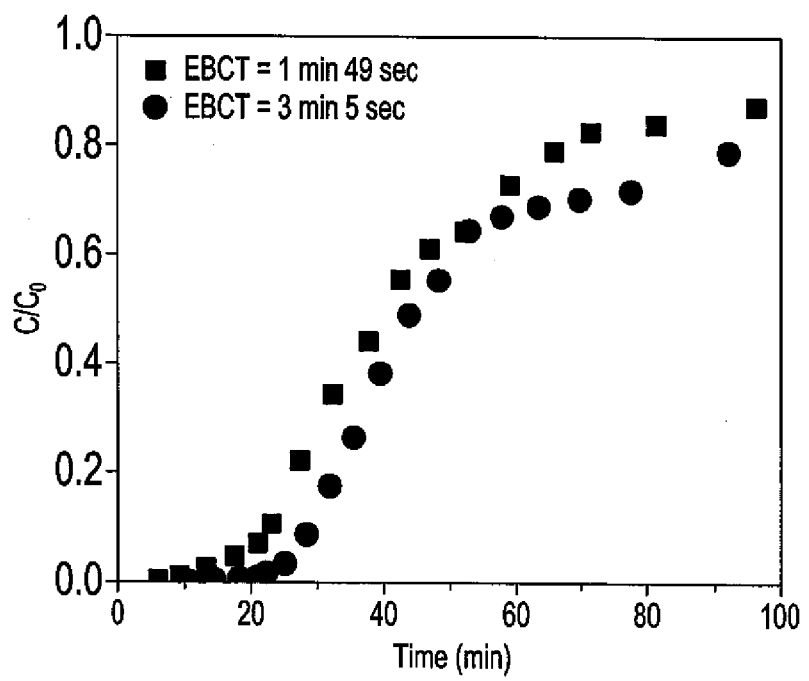
FIG. 7B is a breakthrough plot showing rhodamine B concentration as a function of time in a column of Ruba Al-Khali Saudi sand adsorbent, shown for empty bed contact times (EBCTs) of 1 minute and 49 seconds, and 3 minutes and 5 seconds.

In order to determine the sorption capacity of Ruba Al-Khali Saudi sand in a flow experiment, in a column or bed of sand, the sand was ground into fine particles and then washed with distilled water to remove the impurities. The sand was packed in a glass column. The influence of empty bed contact times (EBCTs) on adsorption was conducted in a column at 1 minute and 49 seconds, and at 3 minutes and 5 seconds, with an initial solution concentration of 6 mg/L. The rhodamine B aqueous solution was passed through the column in a down-flow mode at a flow rate of 5 mL/min. The effluent from the column was collected at regular intervals, and the residual concentrations of the rhodamine B dye in the effluent were analyzed by UV-VIS spectroscopy. The volume of the effluent after which the rhodamine B concentration in the effluent reached the maximum permissible value (1% of initial concentration) was regarded as the breakthrough point. FIG. 7A shows measured concentration as a function of bed volume for EBCT values of 109 seconds and 185 seconds. FIG. 7B shows measured concentration as a function of time for EBCT values of 109 seconds and 185 seconds.

The concentration of rhodamine B detected in the effluent is very low at the initial adsorption stage (as seen in FIGS. 7A and 7B). The breakthrough point ($C_f/C_0$=0.1, $C_f$=0.6 mg/L) is achieved after continuous column adsorption for 10 BV. Along with the adsorption continuing, the rhodamine B concentration in the effluent water is only 72% of that in influent water at an adsorption bed volume of 24.33 BV, suggesting that the adsorbent has a loss of adsorption ability to reach the saturation point. When the EBCT decreases to 1 minute and 49 seconds, the adsorption breakthrough point and saturation point were found to be at 8.11 and 24.19 BV, respectively. Thus, the higher flow did not facilitate the efficient adsorption of rhodamine B on the sand, possibly due to the shorter time of the contact between the adsorbent sand and the adsorbate rhodamine B.

Figure 8A:
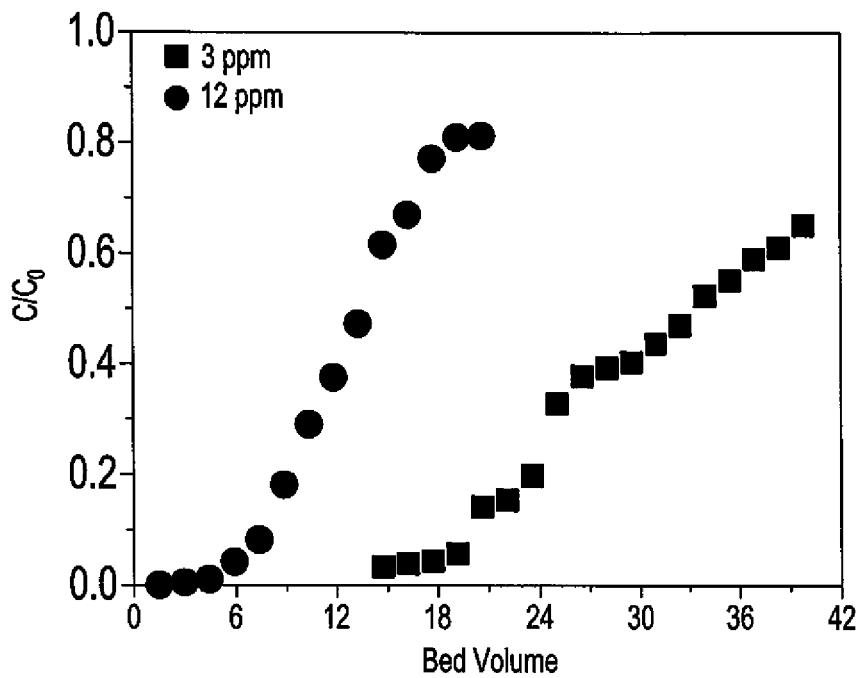
FIG. 8A is a breakthrough plot showing rhodamine B concentration as a function of bed volume in a column of Ruba Al-Khali Saudi sand adsorbent, shown for rhodamine B concentrations of 3 ppm and 12 ppm.
Figure 8B:
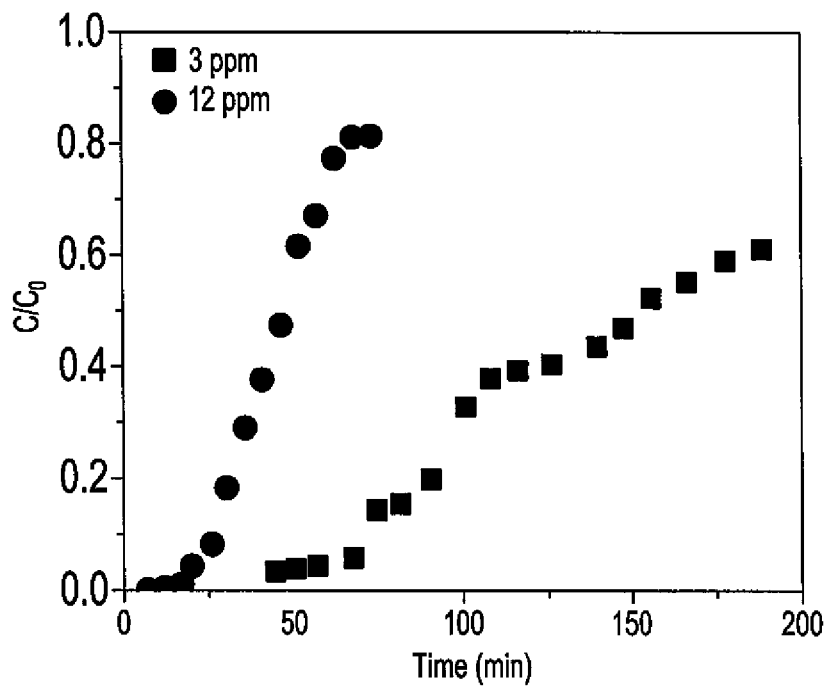
FIG. 8B is a breakthrough plot showing rhodamine B concentration as a function of time in a column of Ruba Al-Khali Saudi sand adsorbent, shown for rhodamine B concentrations of 3 ppm and 12 ppm.

FIGS. 8A and 8B show the results of measured concentration, as a function of bed volume and time, respectively, using to different concentrations of rhodamine B, namely 3 ppm and 12 ppm. EBCT was 3 minutes and 18 seconds. The rhodamine B aqueous solution was passed through the column in a down-flow mode at a flow rate of 5 mL/min. The effluent from the column was collected at regular intervals, and the residual concentrations of the rhodamine B dye in the effluent were analyzed by UV-VIS spectroscopy. The volume of the effluent after which rhodamine B concentration in the effluent reached the maximum permissible value (1% of initial concentration) was regarded as the breakthrough point.

FIGS. 8A and 8B show that the breakthrough points of 20.65 BV and 8.85 BV can be achieved under different concentrations, namely 3 mg/L and 12 mg/L, respectively. Thus, higher initial concentrations may not be beneficial for treatment of greater amounts of wastewater.

Figure 9:
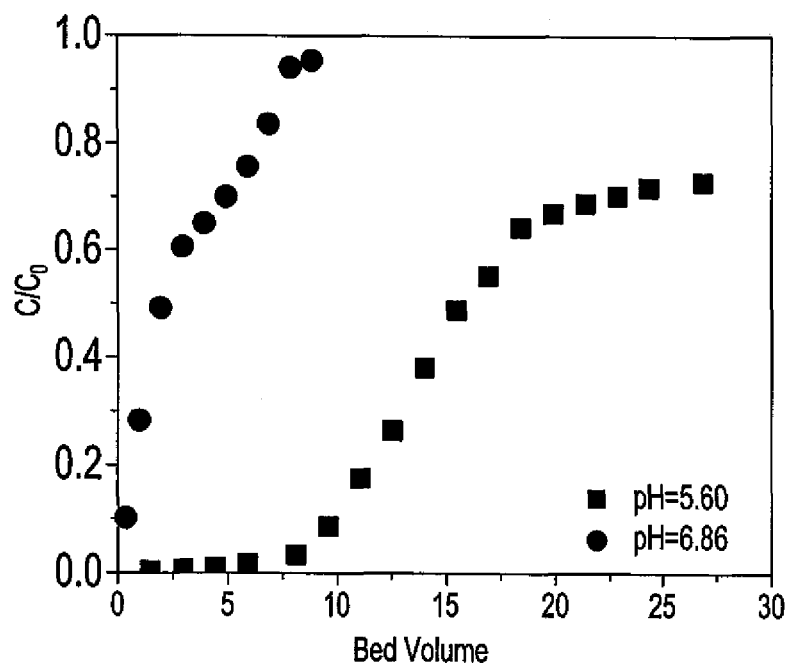
FIG. 9 is a breakthrough plot showing rhodamine B concentration as a function of bed volume in a column of Ruba Al-Khali Saudi sand adsorbent, shown for pH values of 5.60 and 6.86.

FIG. 9 shows the breakthrough plots of rhodamine B concentration as a function of bed volume at pH values of both 5.60 and 6.86, with an EBCT of 3 minutes and 18 seconds. The rhodamine B aqueous solution was passed through the column in a down-flow mode at a flow rate of 5 mL/min. The effluent from the column was collected at regular intervals, and the residual concentrations of the rhodamine B dye in the effluent were analyzed by UV-VIS spectroscopy. The volume of the effluent after which rhodamine B concentration in the effluent reached the maximum permissible value (1% of initial concentration) was regarded as the breakthrough point.

The dependence of pH on adsorption of rhodamine B on Ruba Al-Khali Saudi sand is clearly seen in FIG. 9. It can be seen from the results of FIG. 9 that the pH dependence on dynamic adsorption is significant. When the pH was changed from 5.60 to 6.86, the breakthrough point from 11.06 bed volume (BV) reduced to 0.35 BV, indicating the possible stronger electrostatic repulsion between the adsorbent sand and adsorbate rhodamine B in a stronger basic condition.

It is to be understood that the present invention is not limited to the embodiments described above, but encompasses any and all embodiments within the scope of the following claims.

We claim:

1. In combination, wastewater and a wastewater filtration system, comprising:
    wastewater containing rhodamine B, wherein the pH of the wastewater is about 2;
    a filtration vessel; and
    a filtration media contained in the filtration vessel, the filtration media being Ruba Al-Khali Saudi sand having a composition of at least:
        2.54-44.30% $SiO_2$
        0.55-5.52% $Al_2O_3$,
        0.48-2.95% $Fe_2O_3$,
        20.25-43.43% CaO,
        2.01-15.38% MgO,
        0.08-0.95% $K_2O$,
        0.04-2.39% $Na_2O$,
        0.07-30.30% $SO_4$, and
        0.00-0.59% Cl.

2. A wastewater filtration method, comprising the step of bringing wastewater containing rhodamine B and a pH of the wastewater of about 2 into contact with Ruba Al-Khali Saudi sand for a period of time sufficient for the rhodamine B to be adsorbed by the sand, wherein the Ruba Al-Khali sand has a composition of at least:
    2.54-44.30% $SiO_2$
    0.55-5.52% $Al_2O_3$,
    0.48-2.95% $Fe_2O_3$,
    20.25-43.43% CaO,
    2.01-15.38% MgO,
    0.08-0.95% $K_2O$,
    0.04-2.39% $Na_2O$,
    0.07-30.30% $SO_4$, and
    0.00-0.59% Cl.

* * * * *